May 22, 1951 — G. L. HAMMON — 2,553,763
REGULATOR FILTER
Filed March 11, 1947
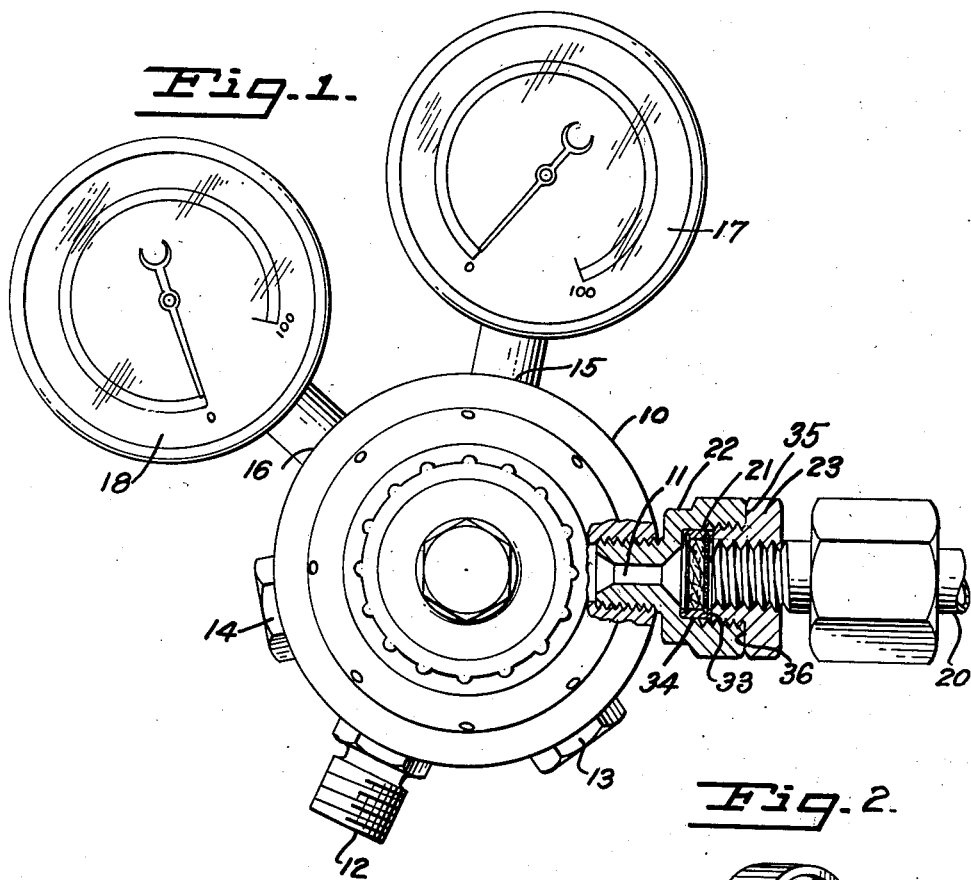
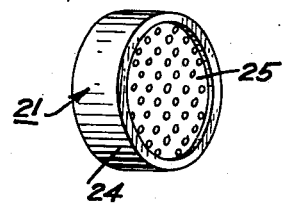
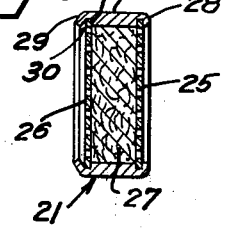
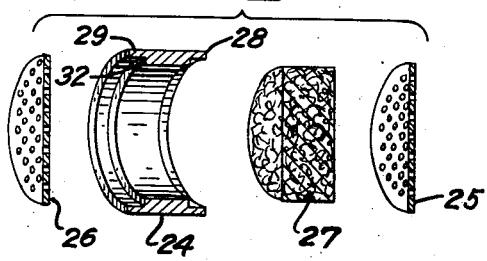
INVENTOR.
GEORGE L. HAMMON
ATTORNEY Patented May 22, 1951

2,553,763

UNITED STATES PATENT OFFICE 2,553,763

REGULATOR FILTER

George L. Hammon, Berkeley, Calif., assignor to National Welding Equipment Co., San Francisco, Calif., a corporation of California Application March 11, 1947, Serial No. 733,929

4 Claims. (Cl. 183—49)

This invention relates to a gas filter for a pressure regulator designed to reduce the pressure of gas from a high-pressure to a lower working pressure.

The gas which issues from a cylinder of oxygen and from other containers passes into the regulator at a pressure of several thousand pounds per square inch. At this and other pressures small particles of dust can do a great deal of damage to the sensitive parts on which the regulator depends for its accuracy.

One object of this invention is to provide a filter arrangement at the inlet to the regulator which will remove foreign matter from the gas as it enters.

Another object of this invention is to provide a filter which can be readily installed as a replaceable unit.

Another object of this invention is to provide a filter which will fit tightly into a regulator inlet in such a manner that none of the high-pressure gas can go around the filter, and at the same time to provide a filter which can be readily removed and replaced.

Other objects and advantages of the invention will appear from the following description.

In the drawings:

Fig. 1 is a plan view of a regulator with the inlet of the regulator in section to show the installation embodied in this invention;

Fig. 2 is a perspective view of the filter;

Fig. 3 is a side view in section of the filter; and

Fig. 4 is an exploded view partly in section of the filter showing the component parts.

The regulator housing 10 has several openings around its periphery. The inlet 11, the outlet 12, safety openings 13 and 14, and gauge openings 15 and 16 for the gauges 17 and 18 are illustrated. For the purpose of this invention it is unnecessary to describe the operation of the regulator except to say that the inlet 11 is attached by the pipe 20 to a source of gas under pressure, such as a cylinder of compressed oxygen, and that the gas issues at the outlet 12 after being reduced within the regulator to a lower working pressure.

The filter 21 is installed between the inlet fixture 22 and the adapter 23, the inlet fixture 22 being threaded into the inlet opening 11, and the adapter 23 being threaded into the inlet fixture 22. The pipe 20 from the source of high-pressure gas is threaded into the adapter 23.

The filter 21 has been designed to overcome the difficulties where a fine mesh screen has been used heretofore as the filtering means. At each end of the filter body 24 is a perforated plate or screen 25, 26, each with perforations fine enough to prevent any large particles of dirt or grit from entering the filter 21 and to prevent any of the filtering material 27 from being forced out of the filter into the working parts of the pressure regulator. The filtering material 27 is some such material as kapok, which will allow the gas to pass freely but will trap any particles of foreign matter and will not itself break up and be blown into the regulator.

One feature of the filter 21 is in making it thicker than the recess in the fitting 22 into which it fits. Another feature is in having the filter body 24 made of a resilient metal such as brass so it is compressible in the recess. The screen 25 is held snugly by the rim 28 of the filter housing 24, the rim 28 being crimped down firmly. On the other hand the rim 29 which holds the screen 26 to the housing 24 is not completely crimped down and leaves the filter compressible. The screen 26 is held firmly against the shelf 32, but the rim 29 is left with a small angle of clearance 30 which leaves it compressible. When the adapter 23 is threaded into the fixture 22, the filter 21 rests between them. The depth of the recess 34 is less than the thickness of the filter 21. Consequently, when the end 33 of the adapter 23 presses against the filter 21 and rim 29 is forced in and the ductile filter body is kept under compression. This assures that there will be no leakage around the filter 21 when the gas passes through the pipe into the inlet 11.

Thus it will be seen that the filter 21, when placed in a regulator with one edge deformed, is self-sealing so that the gas must pass through the filter 21 and cannot go around it.

Moreover, the filter 21 is of such a size, that it seals when the shoulder 36 of the adapter 23 rests against the shoulder 35 of the inlet fitting 22, so that there is a double seal to prevent leakage. This feature not only forces the gas to pass through the filter 21, but also makes the attachment of the regulator 10 to the pipe 20 safer. Thus, when the adapter 23 is threaded into the inlet fitting 22 and the filter 21 is compressed, there are two leak-tight seals on the regulator inlet connections.

A preferred example of the invention has been described, and changes may be made in the size, shape, arrangement, and materials without departing from the spirit of the invention or from the claims below.

I claim:

1. In a pressure regulating device having an inlet fitting with an opening therethrough and an interior recess around said opening which terminates at its inward end in a flat shoulder, the combination therewith of a filter element adapted to fit snugly into said recess and against said shoulder, said filter element having a metal body at one end of which is a partially in-turned resilient circumferential flange, said flange projecting outwardly between a pulley axial and a pulley radial position so as to be compressible in against the remainder of said filter element; and means for securing said element in place in said recess and compressing said flange.

2. In a filter for filtering gases under high pressure, the combination of a metal body portion, a filtering element therein, perforated backing members on each side of said element and held in said body portion by radially inturned flanges on said body portion, at least one of said flanges being incompletely turned in radially so as to form an obtuse angle with the axial wall of said body portion and so as to be resiliently compressible in toward its adjacent perforated backing member, whereby the compression caused by a tight fit is taken up by said flange instead of by said filtering element.

3. A filter adapted to fit tightly in a high-pressure gas conduit and to accommodate itself for variation in the spacing of its abutting parts, including in combination a housing of resilient metal, a filter mass therein, and radial perforated end plates on either side of said mass, said plates being held by end walls of said housing turned inwardly from the axial side wall, at least one of said end walls being turned in intermediate a true axial and a true radial position so as to be axially compressible toward a true radial position, so that said filter may fit snugly between abutting members without further compacting said filter mass, said resilient end walls bending to take up the compression force.

4. In a regulator inlet, the combination of an inlet fitting threaded into the regulator inlet opening and recessed interiorly on its opposite end and having a flat shoulder surrounding said recess; an adapter threaded into the feed line which conducts the compressed gas and having a flat shoulder opposite the shoulder on said inlet fitting, so that when said adaptor is threaded into said inlet fitting said flat shoulders abut to form a leak-tight seal; and a filter cartridge positioned in said recess between said fitting and said adaptor, said cartridge including a metal body and a filter mass in said body, said body having at one end a partially inturned flange which is resiliently compressible axially toward its fully inturned position so as to form with said fitting and adaptor a second leak-tight seal and so as to be removable and to accommodate variations in manufacture of said fitting and said adaptor without causing any additional pressure on said filter mass.

GEORGE L. HAMMON.

REFERENCES CITED

The following references are of record in the file of this patent:

UNITED STATES PATENTS

| Number | Name | Date |
|---|---|---|
| 56,836 | Turrell et al. | July 31, 1866 |
| 228,986 | Crocker | June 22, 1880 |
| 974,519 | Reynolds | Nov. 1, 1910 |
| 1,140,758 | Miller | May 25, 1915 |
| 2,251,964 | Stackhouse | Aug. 12, 1941 |
| 2,321,220 | Liebermann | June 8, 1943 |
| 2,409,278 | Hedges | Oct. 15, 1946 |

FOREIGN PATENTS

| Number | Country | Date |
|---|---|---|
| 646,048 | Germany | June 7, 1937 |
| 353,927 | Italy | Nov. 3, 1937 |